United States Patent [19]
Takeuchi et al.

[11] Patent Number: 6,105,945
[45] Date of Patent: Aug. 22, 2000

[54] INVERTED STRUT DAMPER

[75] Inventors: Takashi Takeuchi; Hironobu Hosoda, both of Saitama, Japan

[73] Assignee: Showa Corporation, Saitama, Japan

[21] Appl. No.: 08/965,959

[22] Filed: Nov. 7, 1997

[30] Foreign Application Priority Data

Nov. 7, 1996 [JP] Japan ..................................... 8-295324

[51] Int. Cl.$^7$ .............................. B60G 13/00; F16F 7/00; F16F 5/00; F16F 9/36
[52] U.S. Cl. ................. 267/200; 267/64.26; 188/322.16; 188/322.19; 277/926; 277/605; 277/925
[58] Field of Search ................................ 267/200, 64.26; 188/322.16, 322.17, 276, 322.19, 269, 315; 277/926, 645, 605, 929, 910; 184/18, 19

[56] References Cited

U.S. PATENT DOCUMENTS

| | | | |
|---|---|---|---|
| 3,524,658 | 8/1970 | De Carbon | 267/64.26 |
| 3,993,294 | 11/1976 | Wossner et al. | 188/269 |
| 4,173,130 | 11/1979 | Sutliff et al. | 188/269 |
| 4,290,511 | 9/1981 | De Baan et al. | 188/322.17 |
| 4,334,600 | 6/1982 | Palitto | 188/269 |
| 4,880,087 | 11/1989 | Janes | 188/322.16 |

*Primary Examiner*—Douglas C. Butler
*Assistant Examiner*—Jeffrey Woller
*Attorney, Agent, or Firm*—Dvorak & Orum

[57] ABSTRACT

An inverted strut damper includes an external cylinder which has an expanded midsection and a vertically moveable damper tube arranged concentrically within the outer cylinder. The outer cylinder and tube arrangement form a lubricating oil supply reservoir. Disposed at a top and a bottom of the outer cylinder is a respective oil seal and bearing arrangement. The upper bearing is adjacent to the lubricating oil reservoir and upon upper movement of the damper tube, oil is supplied to the upper bearings and seal.

10 Claims, 7 Drawing Sheets

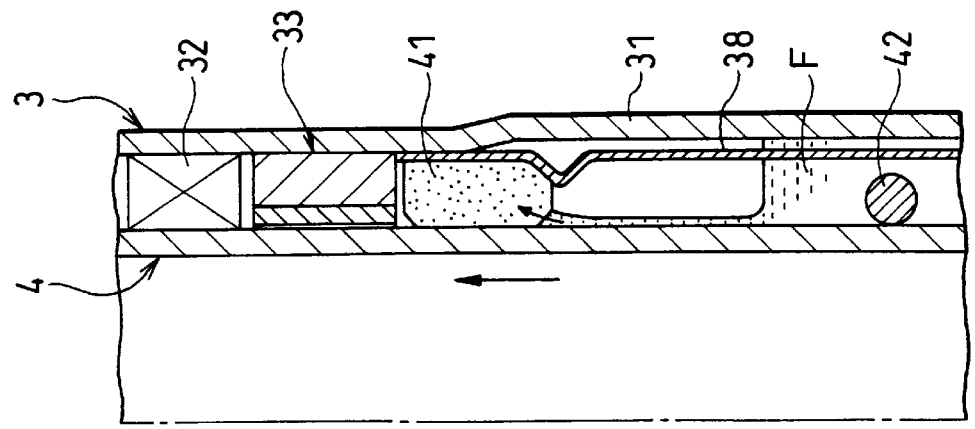
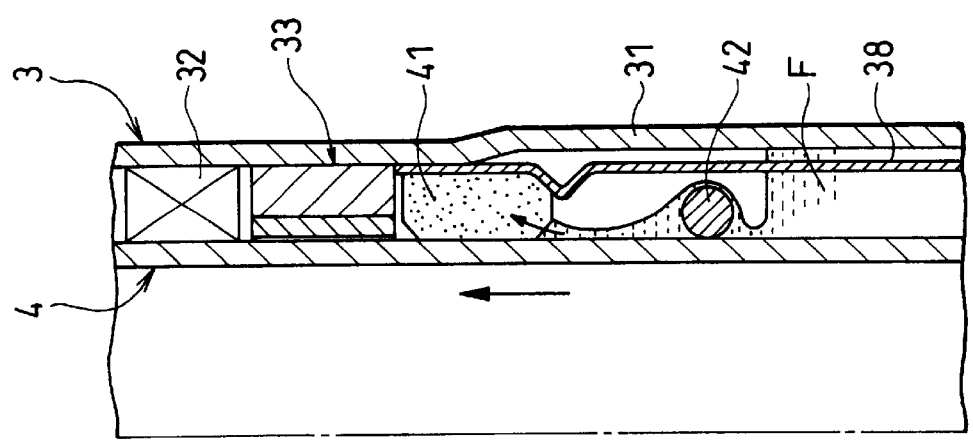
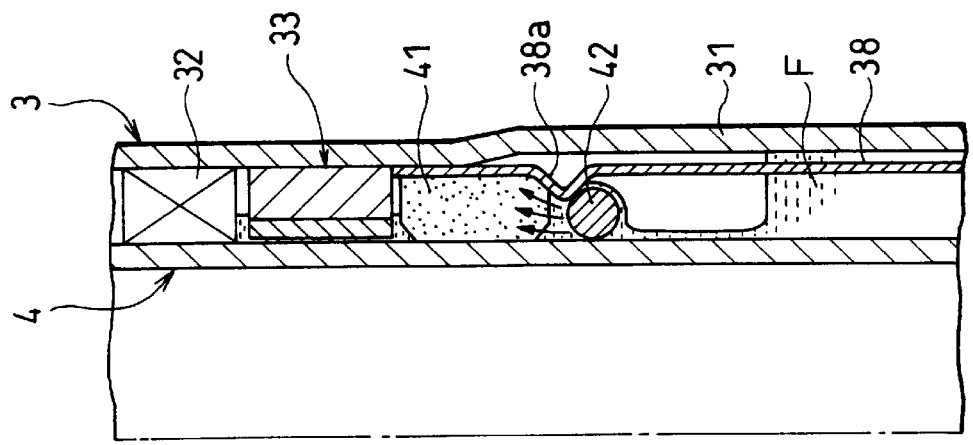

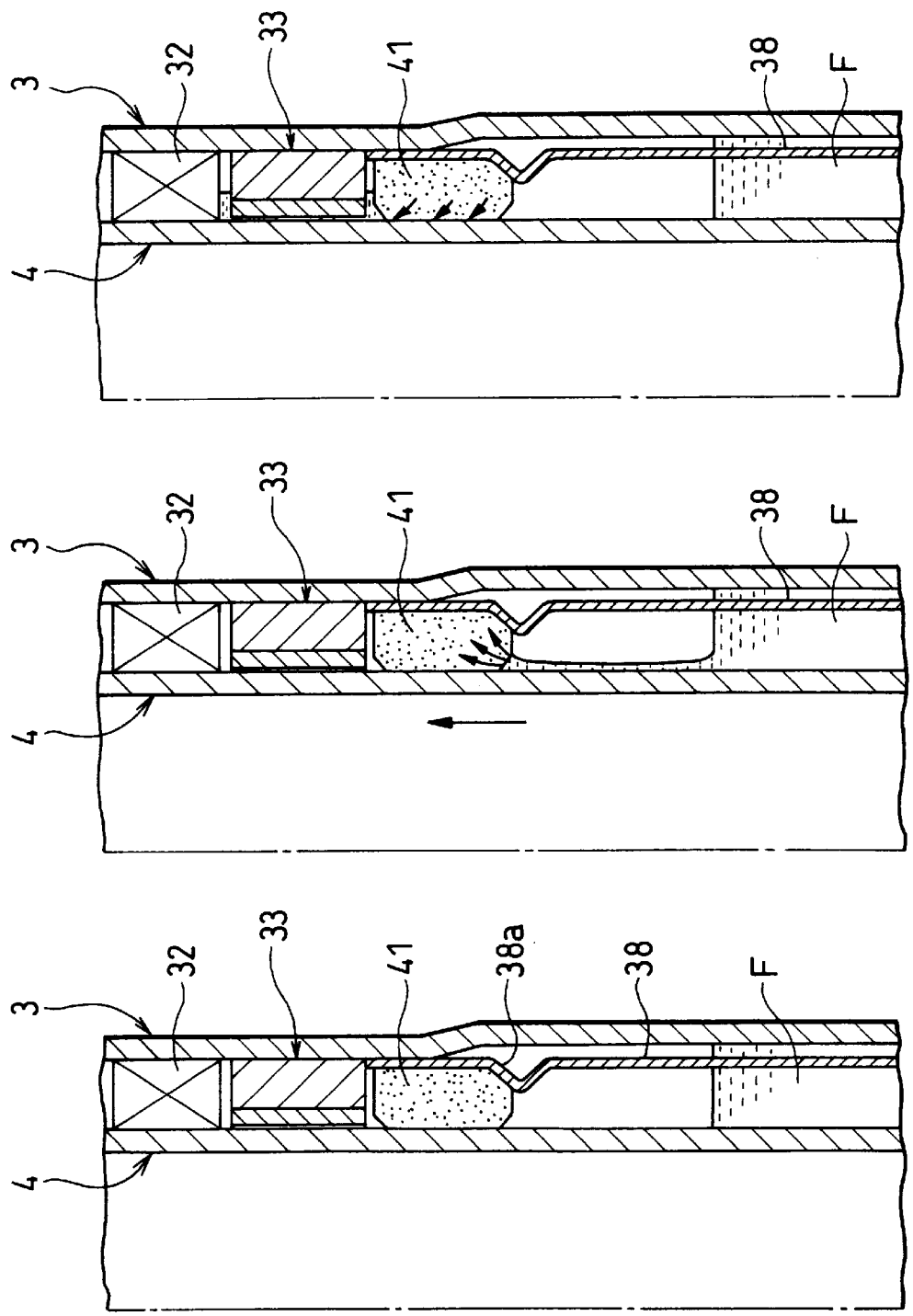

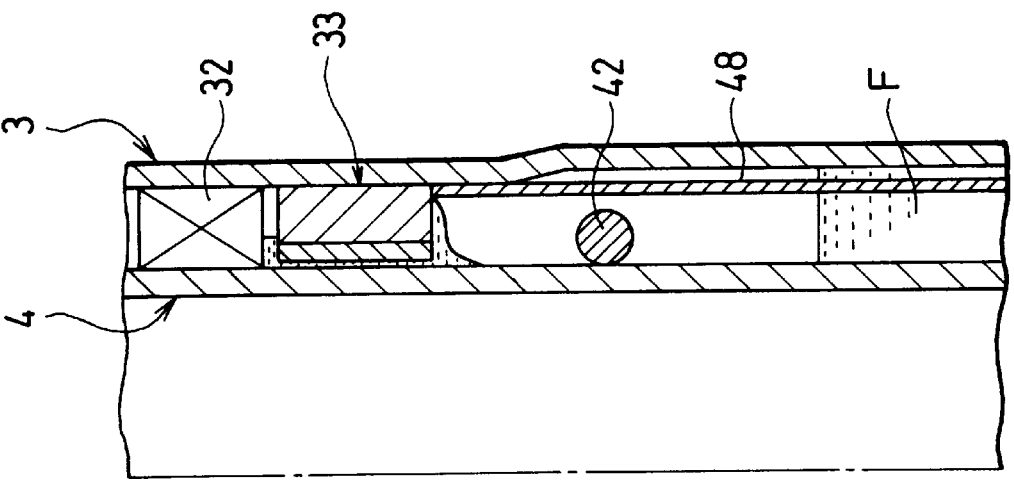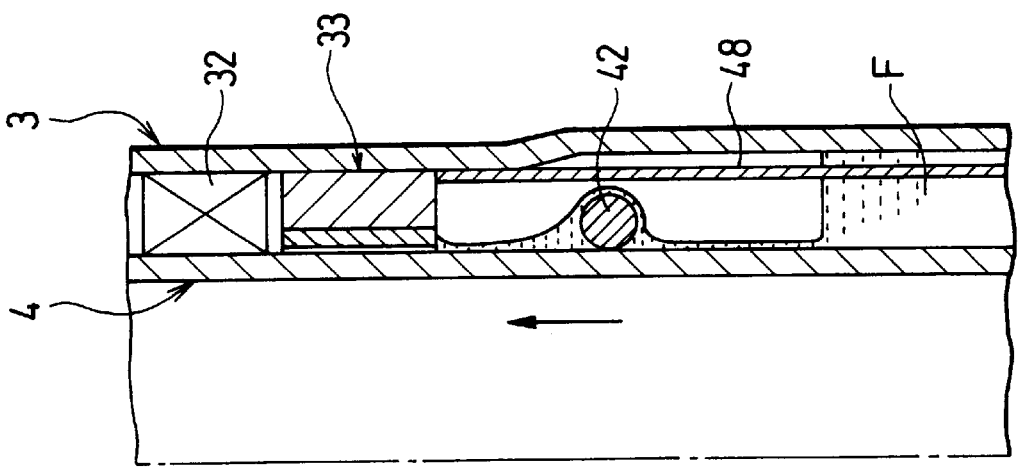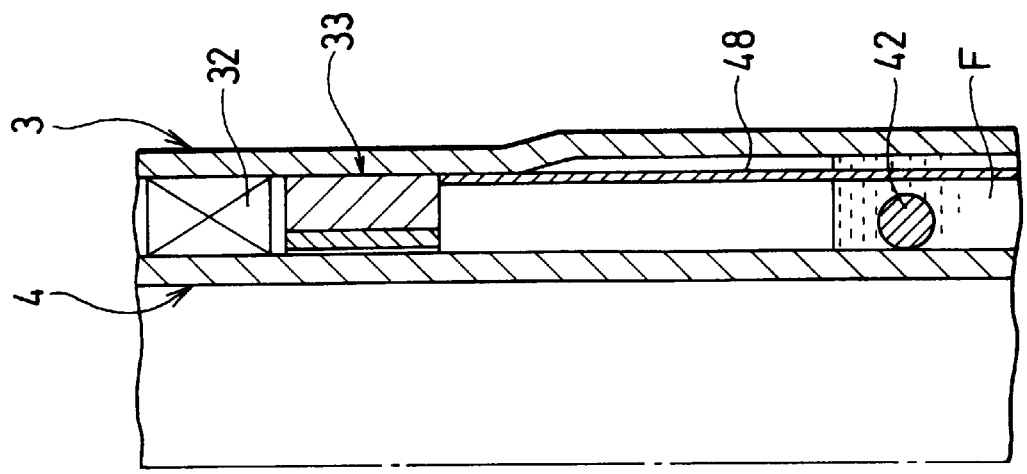

INVERTED STRUT DAMPER

BACKGROUND OF THE INVENTION

1. Field of the Invention

The present invention relates to an inverted strut damper.

2. Discussion of the Background Art

Conventionally, an inverted strut damper is a structure having a damper tube fitted movably upwards and downwards through upper and lower oil seals and upper and lower bearings in an outer cylinder, for lubricating the upper and the lower oil seals and the upper and lower bearings with oil.

In Japanese Patent Application No. 8-227211, the applicant of the present invention has previously proposed a technique for improving lubrication of the upper bearings and the upper oil seals by filling a lubricating chamber storing oil to the full by putting a hollow elastic substance in the lubricating chamber. This technique will be explained below with reference to a drawing of this application.

FIG. 7, labeled "PRIOR ART", is an enlarged diagram of an upper section of an outer cylinder for a conventional inverted strut damper. This diagram shows that an upper oil seal 102 is provided on the top end of an inner plane of an erected outer cylinder 101 of an inverted strut damper 100. Upper bearings 103 are fitted beneath this upper oil seal 102, lower bearings 104 are fitted in the middle of the inner plane of the outer cylinder 101, a lower oil seal 105 is fitted beneath the lower bearings 104. A damper tube 106 is inserted movably upwards and downwards between these upper and lower oil seals 102 and 105 and upper and lower bearings 103 and 104, and a space formed by encircling it with the upper and lower oil seals 102 and 105, and the outer cylinder 101. The damper tube 106 is used as a lubricating chamber 107 for lubricating the upper and lower oil seals 102 and 105 and the upper and lower bearings 103 and 104.

A reference number 108 denotes a porous elastic substance and 109 denotes a distance collar.

The volume of the oil within the lubricating chamber 107 gradually decreases along with its use over a long period of time, so that the upper oil seal 102 and the upper bearings 103 lose their oil impregnation. However, by the upward and downward movement of the damper tube 106, the oil adhered to the outer plane of the damper tube 106 is supplied to the upper oil seal 102 and the upper bearings 103 to lubricate the upper oil seal 102 and the upper bearings 103 without problem.

Although it is always possible to lubricate the upper oil seal 102 and the upper bearings 103 as described above, a further improvement in lubrication is desired under severer lubricating conditions required for the bearings and the oil seals due to the increase in piston speed along with the higher speed of vehicles that occurred in recent years.

The lower bearings 104 and the lower oil seal 105 can be fitted in a simple manner since they can be inserted without pressuring. However, since there is a long distance of the same diameter of the outer cylinder 101 from its upper end to the positions where the lower bearings 104 and the lower oil seal 105 are fitted, a further improvement in their fitting by shortening this distance is also desired.

SUMMARY OF THE INVENTION

It is, therefore, an object of the present invention to provide an inverted strut damper with an improved lubrication of the upper bearings and the upper oil seal and also with an improved fitting of the lower bearings and the lower oil seal.

To achieve the above-mentioned object in the invention, there is provided an inverted strut damper having an upper oil seal fitted to an upper end of an inner plane of an erected external cylinder, having upper bearings fitted beneath thereof, having lower bearings in the middle of said inner plane of said outer cylinder, having a lower oil seal fitted beneath thereof, having a damper tube inserted movably upwards and downwards between said upper and lower oil seals and said upper and lower bearings, and having a space formed by encircling it with said upper and lower oil seals, with said outer cylinder and with said damper tube used as a lubricating oil chamber for lubricating said upper and lower oil seals and said upper and lower bearings, wherein a lubricating oil-impregnated member for enabling a lubricating oil to be supplied to said upper bearings and to said upper oil seal is fitted to a lower plane of said upper bearings.

Moreover, there is provided an inverted strut damper having an upper oil seal fitted to an upper end of an inner plane of an erected external cylinder, having upper bearings fitted beneath thereof, having lower bearings in the middle of said inner plane of said outer cylinder, having a lower oil seal fitted beneath thereof, having a damper tube inserted movably upwards and downwards between said upper and lower oil seals and said upper and lower bearings, and having a space formed by encircling it with said upper and lower oil seals, with said outer cylinder and with said damper tube used as a lubricating oil chamber for lubricating said upper and lower oil seals and said upper and lower bearings. O-rings for guiding an oil within said lubricating oil chamber to the vicinity of said upper bearings by pushing up said oil, are provided in said damper tube.

Furthermore, there is provided an inverted strut damper having an upper oil seal fitted to an upper end of an inner plane of an erected external cylinder, having upper bearings fitted beneath thereof, having lower bearings in the middle of said inner plane of said outer cylinder, having a lower oil seal fitted beneath thereof, having a damper tube inserted movably upwards and downwards between said upper and lower oil seals and said upper and lower bearings, and having a space formed by encircling it with said upper and lower oil seals, with said outer cylinder and with said damper tube used as a lubricating oil chamber for lubricating said upper and lower oil seals and said upper and lower bearings. A hollow or porous elastic substance is accommodated within said lubricating oil chamber, and when said lubricating oil filled in said lubricating oil chamber has been expanded due to a variation in temperature, said expansion is absorbed by a contraction of said hollow elastic substance and when said lubricating oil has been contracted, said hollow elastic substance is expanded.

Moreover, there is provided an inverted strut damper having an upper oil seal fitted to an upper end of an inner plane of an erected external cylinder, having upper bearings fitted beneath thereof, having lower bearings in the middle of said inner plane of said outer cylinder, having a lower oil seal fitted beneath thereof, having a damper tube inserted movably upwards and downwards between said upper and lower oil seals and said upper and lower bearings, and having a space formed by encircling it with said upper and lower oil seals, with said outer cylinder and with said damper tube used as a lubricating oil chamber for lubricating said upper and lower oil seals and said upper and lower bearings, wherein a large diameter section is formed by expanding said outer cylinder between said upper bearings and said lower bearings. A spring sheet for supporting a suspension spring is welded on an outer plane of said larger diameter section, and said upper and lower bearings are fitted to said outer cylinder by insertion.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIGS. 4A to 4C are cross sectional diagrams for showing the operation of the inverted strut damper relating to the present invention;

FIGS. 5A to 5C are cross sectional diagrams for showing an example of a modification of the inverted strut damper relating to the present invention;

FIGS. 6A to 6C are cross sectional diagrams for showing still another example of a modification of the inverted strut damper relating to the present invention.

DESCRIPTION OF THE PREFERRED EMBODIMENTS

Modes of implementation of the present invention will be explained below based on the attached drawings.

Figure 1:
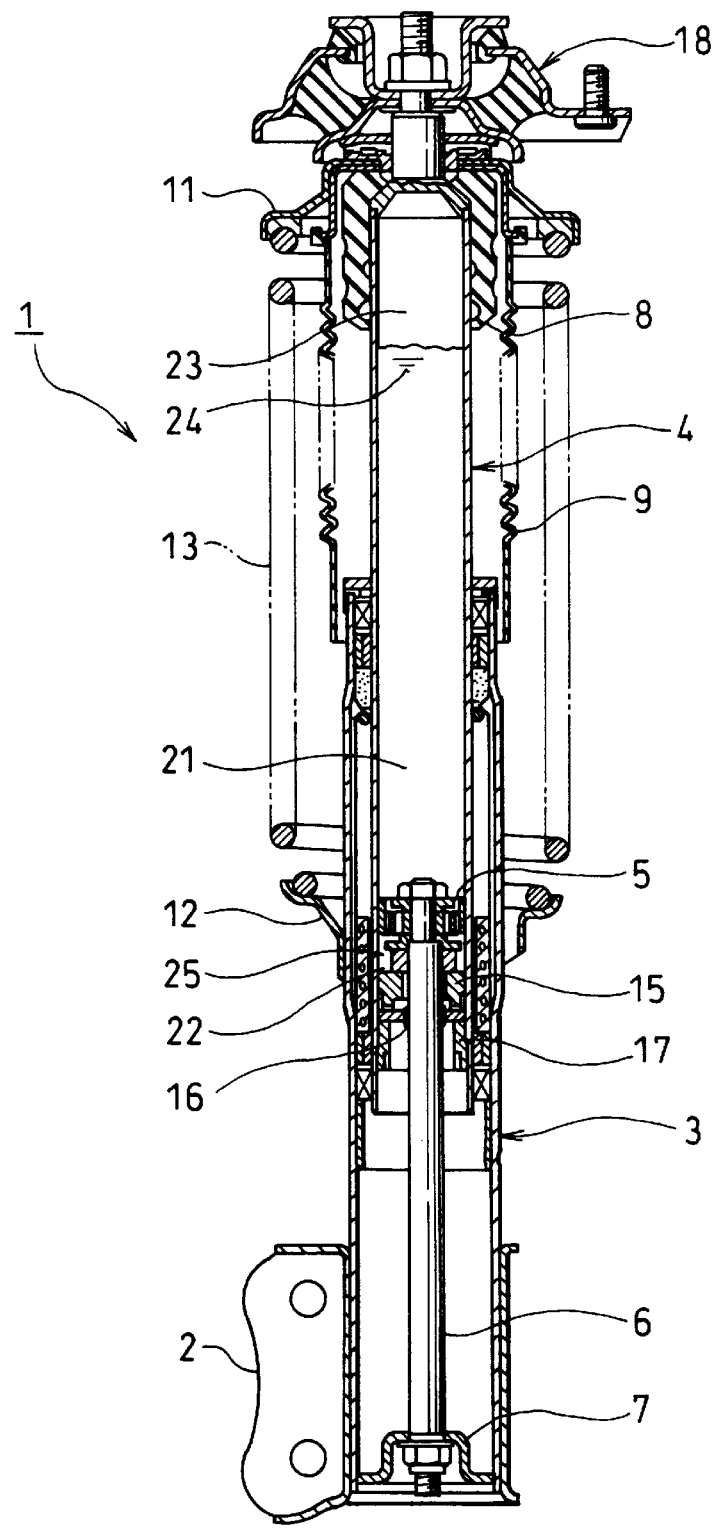
FIG. 1 is a cross sectional diagram of an inverted strut damper relating to the present invention when the strut damper is extended.

FIG. 1 is a cross sectional diagram of an inverted strut damper relating to the present invention when the strut damper is extended. An inverted strut damper 1 has a damper tube 4 inserted as an inner cylinder movably upwards and downwards into an outer cylinder 3 equipped with a fitting bracket 2 (generally referred to as a strut tube). A damper piston 5 is included inside the damper tube 4. The damper piston 5 is fixed to a bottom section 7 of the outer cylinder 3 through a rod 6. A bumping rubber 8 and a dust preventing boot 9 are fitted to face downward at the upper section of the damper tube 4, and a suspension spring 13 is fitted between an upper spring sheet 11 provided at the upper end of the damper tube 4 and a lower spring sheet 12 provided on the outer plane of the outer cylinder 3.

A reference number 15 denotes a rod guide, 16 an oil seal, 17 an oil seal stopper, and 18 a mounting bracket.

The basic operation of the above-described inverted strut damper 1 is explained below.

Referring to FIG. 1, an upper first chamber 21 of the damper piston 5 is filled with a gas 23 in its upper section and a working oil 24 in its lower section. A lower second chamber 22 of the damper piston 5 is filled with a working oil 25 to the full. (The working oil 25 is the same oil as the working oil 24, and these reference numbers are different to discriminate their positions.)

When a press-down force is applied relative to the damper tube 4, a part of the working oil 24 in the first chamber 21 starts moving toward the second chamber 22 through an orifice of the damper piston 5, so that a damping force is generated.

Figure 2:
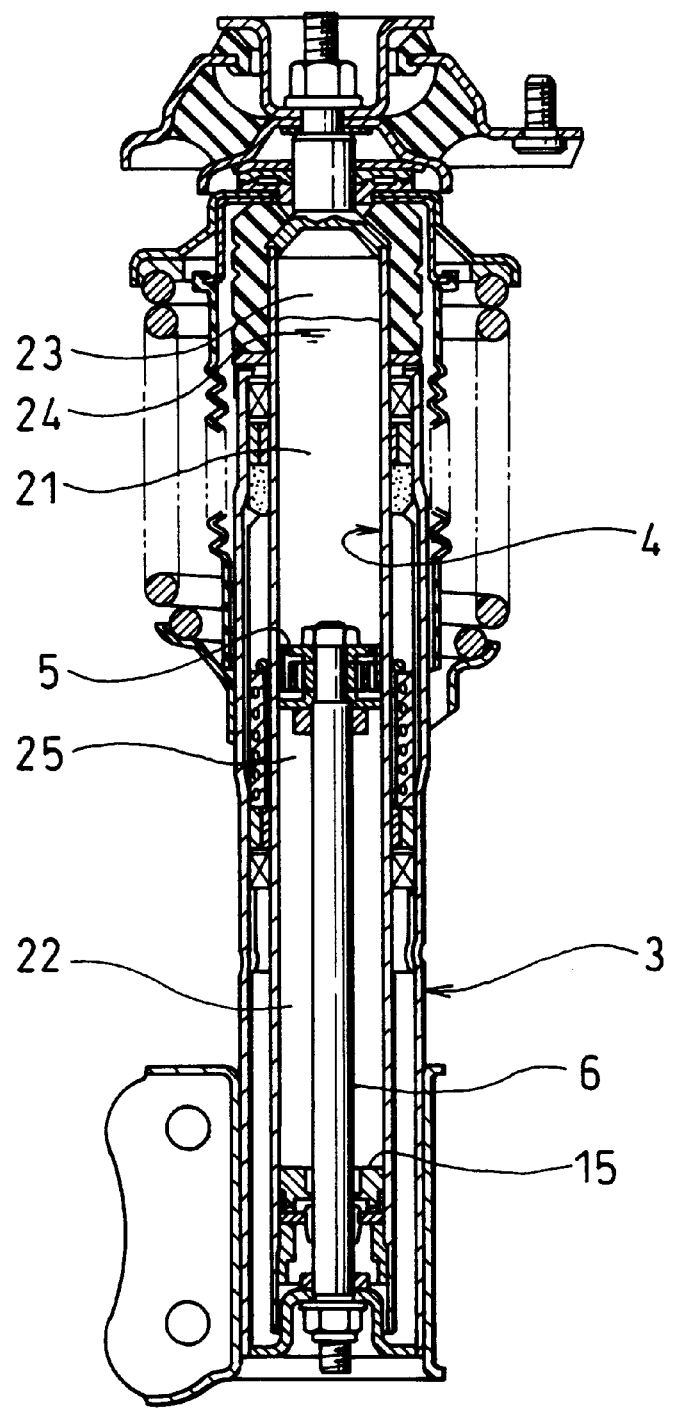
FIG. 2 is a cross sectional diagram of an inverted strut damper relating to the present invention when the strut damper is compressed.

FIG. 2 is a cross sectional diagram for showing the inverted strut damper relating to the present invention when the strut damper is compressed. This shows that the height position of the damper piston 5 remains unchanged but the damper tube 4 has been fully pressed down. In this case, an increase in the volume of the rod 6 moving into the second chamber 22 is absorbed by a contraction of the gas 23 in the upper section of the first chamber 21 by being compressed.

Figure 3:
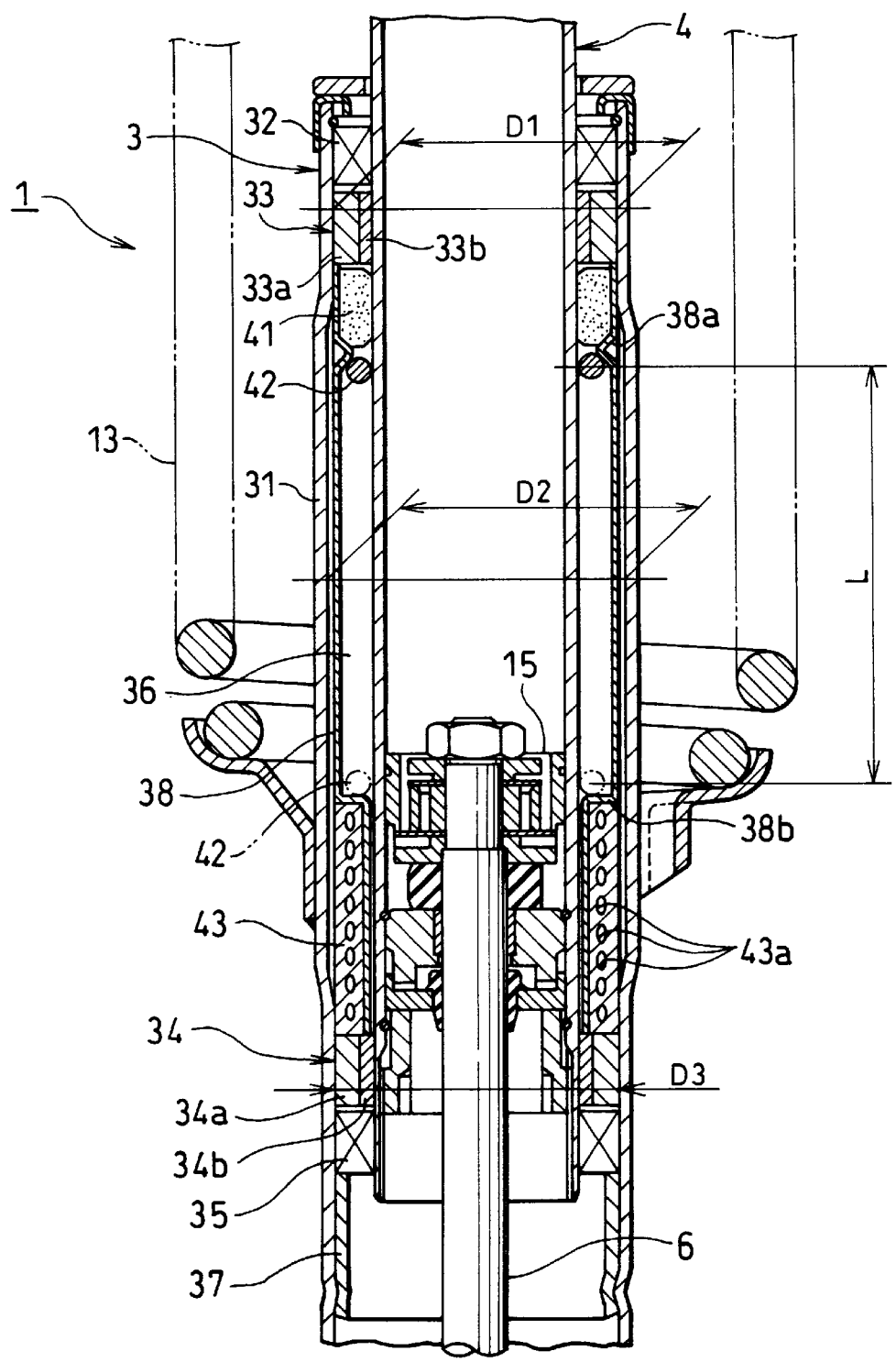
FIG. 3 is an enlarged diagram of an upper section of an outer cylinder of the inverted strut damper relating to the present invention.
Figure 7:
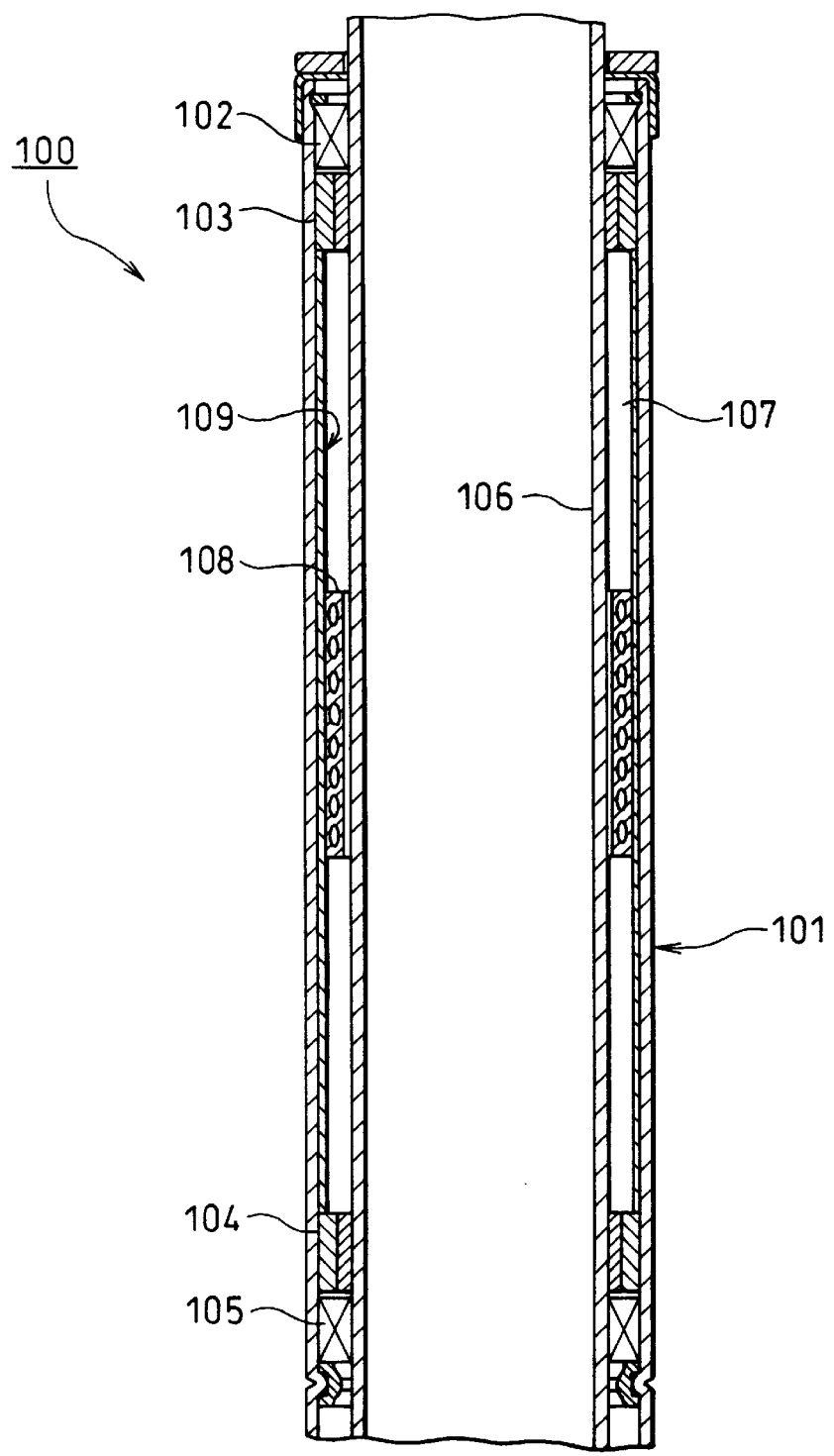
FIG. 7 is an enlarged diagram for showing an upper section of an outer cylinder of an inverted strut damper according to the prior-art technique.

FIG. 3 is an enlarged diagram of the upper section of the outer cylinder relating to the present invention. This shows that a large diameter section 31 is formed by expanding the diameter of the upper section of the outer cylinder 3. An upper oil seal 32 is fitted at the upper end of an inner plane of the outer cylinder 3 at the upper side of this large diameter section 31. Upper bearings 33 are fitted beneath this upper oil seal 32. Lower bearings 34 are fitted on the inner plane of the outer cylinder 3 at the lower side of the large diameter section 31. A lower oil seal 35 is fitted beneath the lower bearings 34. A damp tube 4 is inserted movably upwards and downwards between the upper and lower oil seals 32 and 35 and the upper and lower bearings 33 and 34. A space formed by the upper and lower oil seals 32 and 35, the outer cylinder 3 and the damper tube 4 is used as a lubricating oil chamber 36 for lubricating the upper and lower oil seals 32 and 35 and the upper and lower bearings 33 and 34.

Further, FIG. 3 also shows that a stopper collar 37 is fixed on the inner plane of the outer cylinder 3 by compressing or locally recessing the outer cylinder 3. The lower oil seal 35 is applied to the upper section of this stopper collar 37. The lower bearings 34 are fitted to the lower oil seal 35. The upper bearings 33 are fitted to the upper oil seal 32. A distance collar 38 is provided between the upper and lower bearings 33 and 34, and a lubricating oil-impregnated material 41 attached to the upper bearings 34. O-rings 42 engaged on the outer plane of the damper tube 4 and a hollow or porous elastic substance 43 provided at the lower section are accommodated within the lubricating oil chamber 36.

In the outer cylinder 3, when the inner diameter of a position where the upper oil seal 32 and the upper bearings 33 are fitted is expressed as D1, the inner diameter of the large diameter section 31 is expressed as D2 and the inner diameter of a position where the lower bearings 34 and the lower oil seal 35 are fitted is expressed as D3, there is a relationship of D2>D1=D3.

The upper bearings 33 are provided by engaging a bearing body 33b in a housing 33a. The lower bearings 34 are also provided by engaging a bearing body 34b in a housing 34a.

The outer diameters of the upper bearings 33 and the lower bearings 34 and the outer diameters of the upper oil seal 32 and the lower oil seal 35 are the same and common respectively.

The lubricating oil chamber 36 is a sealed space, and in principle, the lubricating oil is filled to the full at the time of assembling. The volume of the lubricating oil changes according to a temperature change. When the lubricating oil has expanded, the hollow or porous elastic substance 43 is compressed to absorb the expansion, and when the lubricating oil has been compressed, the hollow or porous elastic substance 43 is expanded. Accordingly, it is possible to fill the lubricating oil to the full. As a result, the upper oil seal 32 and the upper bearings 33 can be soaked with lubricating oil to enable a satisfactory lubrication.

The stopper collar 37 is a member for stopping the lower bearings 34 from dropping, and this is a thin panel cylinder according to the present example.

The distance collar 38 is a member for restricting the upper bearings 33 from dropping and the lower bearings 34 from rising. In the present example, the distance collar 38 is a material having a thin-panel two-stage cylinder with a small diameter at its lower section and having a ring-shaped inward-facing projection 38a for restricting the lubricating oil-impregnated material 41 from dropping at the upper section.

The lubricating oil impregnated-material 41 is a material impregnated with oil and for supplying this oil to the upper bearings 33 and the upper oil seal 32 to promote the lubrication of the upper bearings 33 and the upper oil seal 32. For example, a felt formed in a ring shape (generally called a felt ring) is suitable for the lubricating oil impregnated-material 41.

The O-rings 42 move integrally with the damper tube 4 when moving in the oil within the lubricating oil chamber 36 and can move relatively together with the damper tube 4 when a mechanical external force is applied.

With the above-described structure, when the damper tube 4 has moved upwards, the O-rings 42 push up the oil to supply the upper bearings 33 and the upper oil seal 32. The drawing shows a state wherein the O-rings 42 are in contact with the inward-facing projection section 38a of the distance collar 38 after the damper tube 4 has moved upwards. After the damper tube 4 has moved downwards, the O-rings 42 are brought into contact with the upper portion of the bent section 38b of the distance collar 38 as shown by a phantom line.

A movement volume L of the O-rings 42 is smaller than a stroke quantity of the inverted strut damper 1. In other words, when the damper tube 4 has moved upwards, the O-rings 42 at first move integrally with the damper tube 4, but when the O-rings 42 have brought into contact with the inward-facing projection section 38a of the distance collar 38, the O-rings 42 slide on the outer plane of the damper tube 4. When the damper tube 4 has moved downwards, the O-rings 42 at first move integrally with the damper tube 4, but when the O-rings 42 are brought into contact with the bent section 38b of the distance collar 38, the O-rings 42 slide on the outer plane of the damper tube 4.

With the above-described arrangement, it becomes possible to make larger the stroke of the inverted strut damper 1 or to make smaller the overall length of the outer cylinder 3.

The hollow or porous elastic substance 43 is an elastic material including one or a plurality of hollows 43a not communicating to the outside. An independent foamed elastic material or an urethane rubber or a foamed resin covered with a thin rubber or resin, for example, is suitable for the hollow elastic substance 43.

The operation of the above-described inverted strut damper is explained next.

FIGS. 4A to 4C are cross sectional diagrams for showing the operation of the inverted strut damper relating to the present invention; FIG. 4A shows a state wherein the O-rings are in the oil, FIG. 4B shows a state wherein the O-rings are out of the oil, and FIG. 4C shows a state wherein the O-rings reached the lower portion of the lubricating oil-impregnated member.

Referring to FIG. 4A, when the damper tube 4 has moved upwards, the O-rings 42 positioned at the outer plane of the damper tube 4 and the oil adhered to the outer plane of the damper tube 4 rise together with the damper tube 4.

In FIG. 4B, the O-rings 42 push up oil F by which it is surrounded.

In FIG. 4C, when the damper tube 4 continues the rise, the O-rings 42 are brought into contact with the inward-facing projection section 38a of the distance collar 38 and supply oil F to the lubricating oil-impregnated material 41.

In the manner as described above, the lubricating oil-impregnated material 41 can include oil F and can supply oil F to the upper bearings 33 and the upper oil seal 32 even after the O-rings 42 have dropped.

FIGS. 5A to 5C are cross sectional diagrams for showing an example of a modification of the inverted strut damper relating to the present invention, which have the same structure as embodiment shown in FIG. 3 except the O-rings are excluded from the embodiment. The same structural elements as those in FIG. 3 are identified by the same reference numbers so the detailed description will be omitted.

FIG. 5A shows a state wherein the damper tube has stopped, FIG. 5B shows a state where the damper tube has move upwards, and FIG. 5C shows a state where the damper tube has stopped after having moved upward.

In FIG. 5A, in the state where the damper tube 4 is stationary, the oil F stays within the lubricating oil chamber 36.

In FIG. 5B, when the damper tube 4 has moved upward, the oil F adheres to the outer plane of the damper tube 4 and the oil F passes up and is supplied to the lubricating oil-impregnated material 41.

In FIG. 5C, even if the damper tube 4 is stationary, the lubricating oil-impregnated material 41 holds oil F.

In the manner as described above, the lubricating oil-impregnated material 41 can include the oil F and can supply oil F to the upper bearings 33 and the upper oil seal 32 even after the damper tube 4 has become stationary.

FIGS. 6A to 6C are cross sectional diagrams showing still another modification of the inverted strut damper relating to the present invention, which has the same structure as that of the mode of the embodiment shown in FIG. 3 except that the lubricating oil-impregnated material is excluded. The same structural elements as those in FIG. 3 are attached and identified by the same reference numbers so their detailed explanation will be omitted.

FIG. 6A shows a state wherein the O-rings are in the oil, FIG. 6B shows a state where the O-rings are out of the oil and FIG. 6C shows a state where the damper tube is stationary.

Referring to FIG. 6A, in the state where the damper tube 4 is stationary, the oil F stays within the lubricating oil chamber 36.

Referring to FIG. 6B, where the damper tube 4 has moved upward, the O-ring 42 passes out of the oil F and pushes oil upward.

FIG. 6C shows a state wherein after the damper tube 4 continued the upward movement and the O-rings 42 are brought into contact with the lower portion of the upper bearings 33 to supply the uplifted oil F to the upper bearings 33 and the upper oil seal 32, the O-rings 42 are dropped.

With the above-described structures, the present invention exhibits the following effects.

The inverted strut damper has an upper oil seal fitted to an upper end of an inner plane of an erected external cylinder, with upper bearings fitted beneath thereof, and lower bearings in the middle of the inner plane of the outer cylinder, and a lower oil seal fitted beneath thereof, and a damper tube inserted movably upward and downward between the upper and lower oil seals and the upper and lower bearings, and having a space formed by encircling it with said upper and lower oil seals, with the outer cylinder and with the damper tube used as a lubricating oil chamber for lubricating the upper and lower oil seals and the upper and lower bearings, wherein a lubricating oil-impregnated member for enabling a lubricating oil to be supplied to the upper bearings and to the upper oil seal is fitted to a lower plane of the upper bearings. Lubrication is improved because the lubricating oil can always be supplied to the upper bearings and the upper oil seal. As a result, since the upper bearings and the upper oil seal can maintain a smooth sliding with the damper tube, the durability of the inverted strut damper is improved.

The inverted strut damper has an upper oil seal fitted to an upper end of an inner plane of an erected external cylinder, with upper bearings fitted beneath thereof, and lower bearings in the middle of the inner plane of the outer cylinder, a lower oil seal fitted beneath thereof, and a damper tube inserted movably upward and downward between the upper and lower oil seals and upper and lower bearings, and a space formed by encircling it with the upper and lower oil seals, with the outer cylinder and with the damper tube used as a lubricating oil chamber for lubricating the upper and lower oil seals and the upper and lower bearings, wherein O-rings for guiding oil within the lubricating oil chamber to the vicinity of the upper bearings by forcing up the oil are provided in the damper tube. So, lubrication is improved because the lubricating oil can always be supplied to the upper bearings and the upper oil seal by the low-cost O-rings that can be fitted simply. As a result, since the upper bearings and the upper oil seal can maintain a smooth sliding with the damper tube, the durability of the inverted strut damper is improved.

The inverted strut damper has an upper oil seal fitted to an upper end of an inner plane of an erected external cylinder, and upper bearings fitted beneath thereof, and lower bearings in the middle of the inner plane of the outer cylinder, and a lower oil seal fitted beneath thereof, and a damper tube inserted movably upward and downward between the upper and lower oil seals and the upper and lower bearings, and a space formed by encircling it with the upper and lower oil seals, with the outer cylinder and with the damper tube used as a lubricating oil chamber for lubricating the upper and lower oil seals and the upper and lower bearings, wherein a hollow elastic substance is accommodated within the lubricating oil chamber, and when the lubricating oil in the lubricating oil chamber has been expanded due to a variation in temperature, the expansion is absorbed by a contraction of the hollow elastic substance and when the lubricating oil has been contracted, the hollow elastic substance is expanded. So, the lubricating oil can be filled to the full. As a result, the upper oil seal and the upper bearings can be soaked with lubricating oil to enable a satisfactory lubrication.

The inverted strut damper has an upper oil seal fitted to an upper end of an inner plane of an erected external cylinder, and a upper bearings fitted beneath thereof, and lower bearings in the middle of the inner plane of the outer cylinder, and a lower oil seal fitted beneath thereof, and a damper tube inserted movably upward and downward between the upper and lower oil seals and the upper and lower bearings, and has a space formed by encircling it with the upper and lower oil seals, with the outer cylinder and with the damper tube used as a lubricating oil chamber for lubricating the upper and lower oil seals and the upper and lower bearings, wherein a large diameter section is formed by expanding said outer cylinder between the upper bearings and the lower bearings, a spring sheet for supporting a suspension spring is welded on an outer plane of the larger diameter section, and the upper and lower bearings are fitted to the outer cylinder by insertion. So, the lower bearings and the lower oil seal can be simply fitted to the outer cylinder by insertion.

Further, the outer diameters of the upper and lower bearings and the outer diameters of the upper and lower oil seals can be set to be equal and can be used commonly respectively.

Moreover, even if a distortion has occurred in the inner plane of the larger diameter section by a welding of the lower spring sheet, the lower bearings and the lower oil seal can be fitted to the outer cylinder without being affected by this distortion.

As described above, according to the present invention, it becomes possible to provide an inverted strut damper with an improved lubrication of the upper bearings and the upper oil seal and with an improved fitting of the lower bearings and the lower oil seal.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. An inverted strut damper comprising an upper oil seal fitted to an upper end of an inner plane of an erected outer cylinder, upper bearings fitted beneath said upper oil seal, lower bearings in a middle of said inner plane of said outer cylinder, a lower oil seal fitted beneath said lower oil seal, a damper tube inserted movably upward and downward between said upper and lower oil seals and said upper and lower bearings, said outer cylinder and said damper tube forming a space therebetween, which said space is used as a lubricating oil chamber for lubricating said upper and lower oil seals and said upper and lower bearings, said space defined by encircling a reunion of said damper tube with said upper and lower oil seals, a lubricating oil-impregnated member for enabling a liquid lubricating oil to be supplied to said upper bearings and to said upper oil seal, said member fitted to a lower plane of said upper bearings.

2. An inverted strut damper according to claim 1, wherein a stopper collar is fixed to said inner plane of said outer cylinder by recessing said outer cylinder, said lower oil seal is applied to an upper section of said stopper collar, said lower bearings are fitted to said lower oil seal, said upper bearings are fitted to said upper oil seal, and a distance collar is provided between said upper bearings and said lower bearings.

3. An inverted strut damper comprising an upper oil seal fitted to an upper end of an inner plane of an erected outer cylinder, upper bearings fitted beneath said upper oil seal, lower bearings in a middle of said inner plane of said outer cylinder, a lower oil seal fitted beneath said lower oil seal, a damper tube inserted movably upward and downward between said upper and lower oil seals and said upper and lower bearings, said outer cylinder and said damper tube forming a space therebetween, which said space is used as a lubricating oil chamber for lubricating said upper and lower oil seals and said upper and lower bearings, said space defined by encircling a region of said damper tube with said upper and lower oil seals, and O-rings provided within said damper tube for guiding and forcing said oil within said lubricating oil chamber upwards to an area near said upper bearings.

4. An inverted strut damper according to claim 3, wherein a stopper collar is fixed to said inner plane of said outer cylinder by recessing said outer cylinder, said lower oil seal is applied to an upper section of said stopper collar, said lower bearings are fitted to said lower oil seal, said upper bearings are fitted to said upper oil seal, and a distance collar is provided between said upper bearings and said lower bearings.

5. An inverted strut damper comprising an upper oil seal fitted to an upper end of an inner plane of an erected outer cylinder, upper bearings fitted beneath said upper oil seal middle of said inner plane of said outer cylinder, a lower oil seal fitted beneath said lower oil seal, a damper tube inserted movably upward and downward between said upper and lower oil seals and said upper and lower bearings, said outer cylinder and said damper tube forming, a space therebetween, which said space is used as a lubricating oil chamber for lubricating said upper and lower oil seals and said upper and lower bearings, said space defined by encircling a region of said damper tube with said upper and lower oil seals, and wherein a large diameter section is formed on said outer cylinder by expanding said outer cylinder between said upper bearings and said lower bearings, and wherein a spring sheet for supporting a suspension spring welded on an outer plane of said larger diameter section, said upper and lower hearings being fitted to said outer cylinder by insertion.

6. An inverted strut damper according to claim 5, wherein a stopper collar is fixed to said inner plane of said outer cylinder by recessing said outer cylinder, said lower oil seal is applied to an upper section of said stopper collar, said lower bearings are fitted to said lower oil seal, said upper bearings are fitted to said upper oil seal, and a distance collar is provided between said upper bearings and said lower bearings.

7. An inverted strut damper comprising:

a hollow external cylinder having an upper and lower end and a midsection therebetween, said midsection of a larger diameter than said upper and lower ends, said lower end including an annular recession thereabout;

a stopper collar disposed within said external cylinder and fixed to said annular recession of said outer cylinder;

a lower oil seal fitted within said outer cylinder and in resting contact on said stopper collar;

a lower bearing inserted within said outer cylinder and arranged above said lower oil seal said lower oil seal and lower bearing enclosing said lower end of said outer cylinder;

a generally cylindrical, hollow distance collar inserted within said outer cylinder, said distance collar having an upper and lower end, said upper end in contact against a bottom of said upper bearing and said lower end of a reduced diameter which forms a bent section thereof said lower end in contact against a top of said lower bearing;

an upper bearing inserted within said outer cylinder and in resting contact against said upper end of said distance collar;

an upper oil seal inserted with said outer cylinder and arranged above said upper bearing, said upper oil seal and upper bearing enclosing said upper end of said outer cylinder;

a damper tube extending between said upper and lower oil seals and concentrically arranged within said upper and lower bearings, said damper tube and said distance collar forming a lubricating oil chamber therebetween, which said lubricating oil chamber is limited by said upper and lower oil seals, said lubricating oil chamber for lubricating said upper and lower oil seals and said upper and lower bearings; and means for enabling a liquid lubricating oil to be continuously supplied to said upper bearings and seal, said means located within said lubricating oil chamber.

8. The inverted strut damper of claim 7 wherein said oil supply means comprises an O-ring closely fitted about said damper tube, said O-ring carrying a lubricating oil during upward movement of said damper tube, wherein said lubricating oil is splashed against said upper bearing.

9. The inverted strut damper of claim 8 wherein said oil supply means comprises an inward projection formed about said upper end of said damper tube and an oil-impregnated member resting on top of said inward projection and extending between said damper tube and said distance collar, said oil-impregnated member in close approximation to said upper bearing, wherein upward movement of said damper tube drags lubricating oil therealong so as to splash oil against said oil-impregnated member.

10. The inverted strut damper of claim 9 further including an O-ring closely fitted about said damper tube, said O-ring carrying lubricating oil during upward movement of said damper tube so as to splash oil against said oil-impregnated member.

* * * * *